United States Patent
Vander Mey

(10) Patent No.: US 9,705,689 B1
(45) Date of Patent: Jul. 11, 2017

(54) INTEGRATED CALENDAR CALLBACK FEATURE FOR INVITING TO COMMUNICATION SESSION

(75) Inventor: Christopher David Vander Mey, Seattle, WA (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 13/526,234

(22) Filed: Jun. 18, 2012

Related U.S. Application Data

(60) Provisional application No. 61/497,902, filed on Jun. 16, 2011.

(51) Int. Cl.
*G06F 15/16* (2006.01)
*H04L 12/18* (2006.01)

(52) U.S. Cl.
CPC ................ *H04L 12/1822* (2013.01)

(58) Field of Classification Search
CPC .... H04L 12/18–12/1895; H04L 65/106; H04L 67/141
USPC .......... 709/204–207, 227, 228; 370/260–269
See application file for complete search history.

(56) References Cited

U.S. PATENT DOCUMENTS

| | | | |
|---|---|---|---|
| 6,101,480 A | 8/2000 | Conmy et al. | |
| 6,502,127 B1 * | 12/2002 | Edwards | H04L 29/06 709/206 |
| 6,724,764 B2 * | 4/2004 | Bondarenko | H04M 3/5191 370/401 |
| 6,856,962 B2 | 2/2005 | Yonemitsu | |
| 7,251,320 B1 | 7/2007 | Todd | |
| 7,308,090 B2 | 12/2007 | White et al. | |
| 7,343,312 B2 | 3/2008 | Capek et al. | |
| 7,389,473 B1 | 6/2008 | Sawicki et al. | |
| 7,398,294 B2 | 7/2008 | Florkey et al. | |

(Continued)

FOREIGN PATENT DOCUMENTS

| | | |
|---|---|---|
| WO | 2004073288 A2 | 8/2004 |
| WO | 2011137295 A2 | 11/2011 |

OTHER PUBLICATIONS

"Cisco WebEx for the Android", Cisco [online]. First accessed on May 13, 2011. Retrieved from the Internet: <http://www.webex.com/android/android_faq.html> (4 pgs.).

(Continued)

*Primary Examiner* — Lance L Barry
(74) *Attorney, Agent, or Firm* — IP Spring

(57) ABSTRACT

Techniques presented herein may allow an invitee to a communication session to receive a callback at a selected device in order to join the communication session. In one example, a first computing device retrieves a meeting appointment including at least one invitee and a meeting start time for a meeting using a calendar application executed by the first computing device, wherein the meeting appointment is associated with a communication session, and wherein the meeting appointment identifies a second computing device associated with the at least one invitee. The first computing device signals the second computing device to output a network link in a meeting notification provided by the second computing device, wherein the network link enables the second computing device to submit a callback request to the first computing device. The first computing device invites a selected computing device to join the communication session in accordance with the callback request.

14 Claims, 8 Drawing Sheets

(56) References Cited

U.S. PATENT DOCUMENTS

| | | |
|---|---|---|
| 7,669,115 B2 | 2/2010 | Cho et al. |
| 7,676,542 B2 | 3/2010 | Moser et al. |
| 7,756,816 B2 | 7/2010 | Scott |
| 7,930,651 B2 | 4/2011 | May |
| 7,974,871 B2 | 7/2011 | Oral et al. |
| 7,987,233 B1 | 7/2011 | Osborne et al. |
| 8,060,565 B1 | 11/2011 | Swartz |
| 8,065,282 B2 | 11/2011 | Simison et al. |
| 8,081,958 B2 | 12/2011 | Soderstrom et al. |
| 8,214,748 B2 | 7/2012 | Srikanth |
| 8,250,141 B2 * | 8/2012 | Xiao .................. G06Q 10/10 709/204 |
| 8,270,320 B2 | 9/2012 | Boyer et al. |
| 8,553,065 B2 | 10/2013 | Gannu et al. |
| 8,582,743 B2 * | 11/2013 | Teng .................. G06Q 10/109 370/260 |
| 8,583,784 B2 | 11/2013 | Beebe et al. |
| 8,688,489 B2 | 4/2014 | Bhogal et al. |
| 8,817,668 B2 | 8/2014 | Sekaran et al. |
| 2002/0147625 A1 | 10/2002 | Kolke, Jr. |
| 2004/0141005 A1 | 7/2004 | Banatwala |
| 2005/0018826 A1 * | 1/2005 | Benco .................. H04M 3/565 379/202.01 |
| 2005/0018827 A1 | 1/2005 | Himmel et al. |
| 2005/0076098 A1 * | 4/2005 | Matsubara ............ H04L 67/104 709/219 |
| 2005/0131714 A1 | 6/2005 | Braunstein et al. |
| 2005/0289202 A1 * | 12/2005 | S .......................... G06Q 10/109 708/112 |
| 2006/0026502 A1 | 2/2006 | Dutta |
| 2006/0067250 A1 | 3/2006 | Boyer et al. |
| 2006/0106872 A1 | 5/2006 | Leban |
| 2006/0224430 A1 | 10/2006 | Butt |
| 2006/0239212 A1 | 10/2006 | Pirzada et al. |
| 2006/0250987 A1 | 11/2006 | White |
| 2008/0005233 A1 | 1/2008 | Cai |
| 2008/0072334 A1 | 3/2008 | Bailey |
| 2008/0126953 A1 | 5/2008 | Davidson et al. |
| 2008/0195585 A1 * | 8/2008 | Altberg ............ G06F 17/30864 |
| 2008/0205616 A1 | 8/2008 | Teng et al. |
| 2008/0215961 A1 * | 9/2008 | Altberg .................. H04L 12/14 715/205 |
| 2008/0226051 A1 | 9/2008 | Srinivasan |
| 2008/0240392 A1 | 10/2008 | Berstis et al. |
| 2009/0083639 A1 | 3/2009 | McKee Cooper et al. |
| 2009/0112671 A1 | 4/2009 | Grodum |
| 2009/0112984 A1 | 4/2009 | Anglin et al. |
| 2009/0181659 A1 | 7/2009 | Stalnacke et al. |
| 2009/0192845 A1 | 7/2009 | Gudipaty et al. |
| 2009/0222741 A1 | 9/2009 | Shaw |
| 2009/0327019 A1 | 12/2009 | Addae et al. |
| 2010/0005142 A1 * | 1/2010 | Xiao .................. G06Q 10/10 709/204 |
| 2010/0076804 A1 | 3/2010 | Jones |
| 2010/0098230 A1 * | 4/2010 | Bhow .................. H04L 12/1818 379/202.01 |
| 2010/0121666 A1 | 5/2010 | Niazi |
| 2010/0158220 A1 | 6/2010 | Silverman |
| 2010/0189238 A1 | 7/2010 | Gupta |
| 2010/0189244 A1 | 7/2010 | Sastry |
| 2010/0189260 A1 | 7/2010 | Ramanathan et al. |
| 2010/0217591 A1 | 8/2010 | Shpigel |
| 2010/0235216 A1 * | 9/2010 | Hehmeyer ............ G06Q 10/109 705/7.26 |
| 2010/0310062 A1 | 12/2010 | Srinivasan et al. |
| 2011/0022967 A1 | 1/2011 | Vijayakumar |
| 2011/0054976 A1 | 3/2011 | Adler et al. |
| 2011/0135079 A1 | 6/2011 | Shah et al. |
| 2011/0173270 A1 | 7/2011 | Uchida |
| 2011/0264745 A1 | 10/2011 | Ferlitsch |
| 2011/0270922 A1 | 11/2011 | Jones et al. |
| 2012/0230484 A1 * | 9/2012 | Kannappan ............ H04M 3/565 379/202.01 |
| 2012/0258726 A1 | 10/2012 | Bansal et al. |
| 2012/0278381 A1 | 11/2012 | Ferlitsch et al. |
| 2012/0293605 A1 | 11/2012 | Seferian et al. |
| 2012/0304078 A1 | 11/2012 | Ramaswamy et al. |
| 2013/0237240 A1 | 9/2013 | Krantz et al. |

OTHER PUBLICATIONS

Henry, "Bridg.me Calls You When the Conference Starts," Apr. 24, 2011, Lifehacker [online]. Retrieved from the Internet: <http://lifehacker.com/5795119/bridgme-calls-you-when-the-conference-starts> (2 pgs.).

"Impossibly Simple Conference Calling,", Bridg.Me [online]. First accessed on May 13, 2011. Retrieved from the Internet: <http://beta.bridg.me/> (1 pg.).

Framer, "Conference Calling Provider," Jun. 17, 2010, Article Trader [online]. Retrieved from the Internet: <http://www.articletrader.com/business/communication/conference-calling-provider.html> (2 pgs.).

"Dial-Out to conference call participants automatically with UBlast," American International Telephonics, LLC [online]. First accessed on May 13, 2011. Retrieved from the Internet: <http://www.aitelephone.com/conference-call-group-dial-out.html> (4 pgs.).

"WebEx Meeting Center," Cisco [online]. First accessed on May 13, 2011. Retrieved from the Internet: <http://try.webex.com/meet/shop/webex_express_06.html> (4 pgs.).

Tsotsis, "With Bridg.me the Conference Calls You," Apr. 21, 2011, TechCrunch [online]. Retrieved from the Internet: <http://techcrunch.com/2011/04/21/with-bridg-me-the-conference-calls-you/> (1 pg.).

Horowitz, "Idea of the Day: A Conference Line That Calls All of the Participants So They Don't Have to Dial in," Apr. 22, 2011, Business Insider [online]. Retrieved from the Internet: <http://www.businessinsider.com/idea-of-the-day-schedule-a-conference-call-on-google-calanders-and-bridgme-will-call-all-participants-at-the-correct-time-2011-4> (2 pgs.).

Managing participants in a conference via conference user interface www.google.com/patents/US20110270922 App.—Filed Apr. 30, 2010—Boland T. Jones—American Teleconferencing Services Ltd.

Notice of Allowance mailed Sep. 2, 2015 in U.S. Appl. No. 13/526,355.

Annie I. Anton "Goal-Based Requirements Analysis" 1996 IEEE, Proceedings of ICRE pp. 137-144.

Final-Office Action mailed May 14, 2015 in U.S. Appl. No. 13/526,247.

An intelligent fuzzy meeting agent for decision support system Chang-Shing Lee ; Chen-Yu Pan Fuzzy Systems, 2003. Fuzz '03. The 12th IEEE International Conference.

Non-Final-Office Action mailed Dec. 24, 2014 in U.S. Appl. No. 13/526,247.

Final-Office Action mailed Apr. 15, 2014 in U.S. Appl. No. 13/526,247.

Non-Final-Office Action mailed Oct. 15, 2013 in U.S. Appl. No. 13/526,247.

Non-Final-Office Action mailed Jan. 6, 2014 in U.S. Appl. No. 13/526,355.

Final-Office Action mailed Mar. 18, 2014 in U.S. Appl. No. 13/526,355.

Non-Final-Office Action mailed Aug. 19, 2014 in U.S. Appl. No. 13/526,355.

Final-Office Action mailed Mar. 11, 2015 in U.S. Appl. No. 13/526,355.

USPTO, Non-final Office Action for U.S. Appl. No. 13/526,247, Mar. 10, 2016, 18 pages.

Non-Final Office Action for U.S. Appl. No. 13/526,247, mailed Oct. 9, 2015.

"USPTO", Final Office Action received in U.S. Appl. No. 13/526,247, Jan. 3, 2017, 25 pages.

\* cited by examiner

INTEGRATED CALENDAR CALLBACK FEATURE FOR INVITING TO COMMUNICATION SESSION

CLAIM OF PRIORITY

This application claims the benefit of priority to U.S. Provisional Application No. 61/497,902, filed Jun. 16, 2011, which is assigned to the assignee hereof and is hereby expressly incorporated by reference herein.

TECHNICAL FIELD

This disclosure relates to virtual conferencing.

BACKGROUND

Three or more users of computing devices may engage in real-time video communications, such as video conferencing, where the users (also referred to as participants) exchange live video and audio transmissions.

SUMMARY

In one example, a method is provided that comprises scheduling, by a first computing device, an appointment at a meeting time using a calendar application executed by the first computing device, wherein the appointment is associated with a communication session that enables communication between different computing devices, and wherein the appointment identifies a second computing device that is an invitee to the communication session. The method further comprises signaling the second computing device, by the first computing device, to output a network link in a meeting notification provided by the second computing device, wherein the network link enables the second computing device to submit a callback request to the first computing device. The method also comprises inviting, by the first computing device, a selected computing device to join the communication session in accordance with the callback request.

In another example, a method is provided that comprises determining, by a first computing device, a scheduled meeting time for a communication session between the first computing device and at least a second computing device, wherein the communication session enables communication between the first computing device and at least the second computing device. The method also comprises outputting, by an output device of the first computing device, a network link in a meeting notification, wherein the network link enables the first computing device to create a callback request, and wherein a selected computing device is invited to the communication session in accordance with the callback request.

In yet another example, a method is provided that comprises sending, by a first computing device, a meeting notification from a calendar application at a scheduled time specified by the meeting notification to a second computing device associated with an invitee to a communication session that enables communication between different computing devices. The method further comprises receiving, by the first computing device, a control message issued by a network-based application that indicates the second computing device requested a callback for a selected computing device. The method also comprises inviting the selected computing device, by the first computing device, to the communication session at approximately the scheduled time specified in the meeting notification, wherein an invitation enables the second computing device to join the communication session.

In another example, a computer-readable storage medium is provided that comprises instructions for causing a programmable processor to perform operations. The instructions may include scheduling, by a first computing device, an appointment at a meeting time using a calendar application executed by the first computing device, wherein the appointment is associated with a communication session that enables communication between different computing devices, and wherein the appointment identifies a second computing device to be included in the communication session. The instructions may also include signaling the second computing device, by the first computing device, to output a network link in a meeting notification provided by the second computing device, wherein the network link enables the second computing device to submit a callback request to the first computing device. The instructions may also include receiving, by the first computing device, the callback request and responsive to receiving the callback request, inviting, by the first computing device, a selected computing device to join the communication session in accordance with the callback request In yet another example, a computing device comprising one or more processors is provided. The computing device may further comprise a network interface to connect to a communication session, wherein the communication session enables communication between the computing device and one or more other computing devices. The computing device may also comprise means for providing a network link in a meeting notification, wherein the network link enables the computing device to create a callback request, wherein a selected computing device is invited to the communication session in accordance with the callback request.

The details of one or more aspects of the disclosure are set forth in the accompanying drawings and the description below. Other features, objects, and advantages of the disclosure will be apparent from the description and drawings, and from the claims.

In accordance with common practice, the various described features are not drawn to scale and are drawn to

DETAILED DESCRIPTION

Techniques of the present disclosure are directed at functionality for integrating a calendar application with a communications application that may be used for conference calls. Some computing devices such as mobile devices, smart phones, personal data assistants (PDAs), or tablet computers are often used in situations where it may be difficult to make a phone call to connect to a conference. As such, techniques of the present disclosure are directed to methods for receiving a call back on a computing device in order to join a conference call.

A user may communicate with others, such as conferencing with colleagues or socializing with friends by chatting, watching television or videos, playing games, or engaging in other activities. In some instances, a user and other participants in a conference call may not be in the same physical location. Instead, the user and her or his friends or colleagues may rely on other mechanisms to socialize and conference, such as talking on the phone, sending email, or text messaging.

A communication session as used herein is a broad term encompassing as its plain and ordinary meaning, including but not limited to, one or more objects, which may be stored in and/or are executable by hardware, which may enable communication clients coupled to the one or more objects to exchange information. The one or more objects may include data and/or provide functionality of a communication session as described herein. As used herein, a conference call and a communication session are used interchangeably to refer to a multi-party conference. A communication session may also be a virtual hangout.

A virtual hangout may be a virtual space where multiple users can engage in a conversation and/or share information. When a user is available for a conversation (for example, the user is hanging out), the user may select an option in an application (for example, a social media application) that indicates the user is available. An invitation or notification may be sent to people associated with the user (for example, the user's friends) indicating that the user is available to chat. The invitation may be provided in a social media feed. When a second user decides to converse with the first user, a hangout is initiated between the users. Techniques of this disclosure may be applied to communication sessions that are virtual hangouts.

Figure 1:
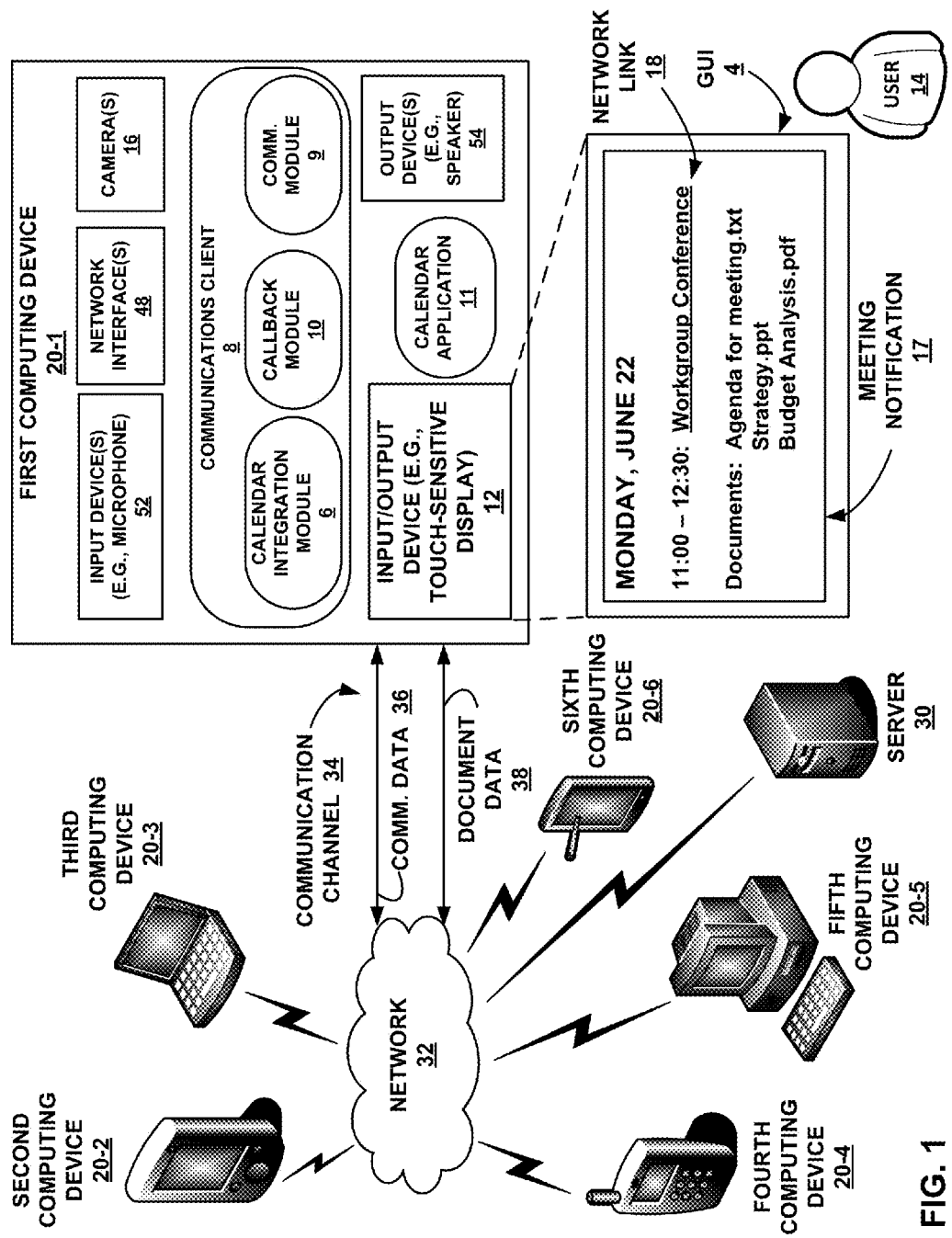
FIG. 1 is a block diagram illustrating an example of a computing device that may execute one or more applications and engage in a communication session with one or more other computing devices, in accordance with one or more aspects of the present disclosure.

FIG. 1 is a block diagram illustrating an example of a first computing device 20-1 that may execute one or more applications (for example, communication client 8 and calendar application 11) and engage in a conference or communication session with one or more other computing devices 20-2 through 20-6, in accordance with one or more aspects of the present disclosure. As described herein, first computing device 20-1 may simply be referred to as computing device 20-1. Computing device 20-1 may integrate calendar application 11 with communications client 8 to connect a user 14 of computing device 20-1 to a scheduled communication session. Communications client 8 may also use a call back module 10 to receive a call back at computing device 20-1, or another device such as a telephone, from a conferencing application.

Computing device 20-1 may engage in a voice or video conference with a plurality of other computing devices, such as computing devices 20-2 through 20-6. That is, user 14 may use computing device 20-1 to engage with other participants using other computing devices 20-2 through 20-6 in a communication session. Computing device 20-1 may connect to one or more other computing devices 20-2 through 20-6 through network 32. As illustrated in FIG. 1, other computing devices may include second computing device 20-2, third computing device 20-3, fourth computing device 20-4, fifth computing device 20-5, and sixth computing device 20-6. Thus, as shown in FIG. 1, six computing devices 20-1 through 20-6 (referred to herein collectively as "computing devices 20") are shown as being engaged in a communication session. In further examples, different numbers of computing devices 20 may be implemented. For illustrative purposes, FIG. 1 is discussed in terms of a currently ongoing communication session between computing device 20-1 and computing devices 20-2 through 20-6.

Computing device 20-1 may, in some examples, include or be part of a portable computing device (for example, a mobile phone, netbook, laptop, personal data assistant (PDA), tablet device, portable gaming device, portable media player, e-book reader, or a watch) as well as non-portable devices (for example, a desktop computer). For purposes of illustration only, in this disclosure, computing device 20-1 is described as a portable or mobile device, but aspects of this disclosure should not be considered limited to such devices. Similarly, computing devices 20 may include or be part of a portable computing device as well as non-portable devices. As illustrated, second computing device 20-2 may be a PDA, third computing device 20-3 may be a laptop, fourth computing device 20-4 may be a mobile phone, fifth computing device 20-5 may be a desktop computer, and sixth computing device 20-6 may be a tablet device. Any other numbers and combinations of types of computing devices participating in a video conference according to techniques of this disclosure are contemplated.

Computing device 20-1 may include an input/output device 12 (for example, a touch-sensitive device), one or more input devices 52 (for example, a microphone), one or more cameras 16, and one or more output devices 54 (for example, a speaker). In some examples, input/output device 12 may comprise a display device that outputs a graphical user interface (GUI) 4. In some examples, input/output device 12 may only be an output device. For example, input/output device 12 may be a screen without input capabilities. In other examples, input/output device 12 may be a presence-sensitive screen or a touch screen. In some examples, input/output device 12 may be capable of receiving touch input from user 14 (for example, GUI 4 may comprise a touch screen, track pad, track point, or the like). User 14 may interact with input/output device 12, for example, by performing touch input on GUI 4. One example of computing device 20-1 is more fully described in FIG. 2, discussed below.

Computing device 20-1 may connect to network 32, including a wired or wireless network, via one or more network interfaces 48. Computing device 20-1 may connect to computing devices 20-2 through 20-6, or to any other number of computing devices. Computing devices 20-2 through 20-6 may be connected to network 32 via wired and/or wireless links. Network 32 may include a wide-area network such as the Internet, a local-area network (LAN), an enterprise network, a wireless network, a cellular network, a telephony network, a Metropolitan area network (for example, Wi-Fi, WAN, or WiMAX), one or more other types of networks, or a combination of two or more different types of networks (for example, a combination of a cellular network and the Internet).

In another example, computing device 20-1 may connect to server 30 through one or more network interfaces 48. Computing device 20-1 and computing devices 20-2 through 20-6 may send data to or receive data from server 30 via network 32. Server 30 may be any of several different types of network devices. For instance, server 30 may be a conventional web server, a specialized media server, a personal computer operating in a peer-to-peer fashion, or another type of network device. In other examples, server 30 may provide conference calling capabilities in accordance with one aspect of this disclosure. For example, server 30 may manage a six-way communication session between computing devices 20. In another example, server 30 may provide at least one of calendar or call back capabilities.

Computing device 20-1 may connect or be connected to any of the computing devices 20-2 through 20-6 in a peer-to-peer fashion, either directly or through network 32. A peer-to-peer connection may be a network connection that partitions tasks or workloads between peers (for example, first computing device 20-1 and second computing device 20-2) without centralized coordination by a server (for example, server 30). Computing device 20-1 and second computing device 20-2 may exchange communication data over communication channel 34 via a peer-to-peer connection. In other examples, any combination of computing device 20-1 and computing devices 20-2 through 20-6 may communicate in a peer-to-peer fashion.

Although the systems and techniques described herein support conferencing capabilities, for illustrative purposes only, FIG. 1 will be described in terms of a real-time video communication between first computing device 20-1 and second through sixth computing devices 20-2 through 20-6. However, it is to be understood that the techniques and examples described in accordance with this disclosure apply to other types of communication sessions having any number of two or more participants. Also, for illustrative purposes only, this disclosure refers to participants in the sense that there is a single participant (for example, a person or user) for each computing device 20. However, it is to be understood that there may be more than one participant for each of computing devices 20. In other examples, any of computing devices 20 may be engaged in a video conference without a user.

This disclosure also describes, for illustrative purposes only, each of computing devices 20 as transmitting a single audio or video feed. However, it is to be understood that there may be more than one audio or video feed from each of computing devices 20. For example, more than one user may be using a single computing device, such as, for example, computing device 20-4, to participate in a video conference. In such an example, computing device 20-4 may include more than one input devices 52 (for example, two microphones and two cameras). In such an example, the techniques described in this disclosure may be applied to the additional audio or video feeds as if they were from separate computing devices.

In FIG. 1, computing devices 20-1 through 20-6 have established a real-time video communication, referred to herein as a video conference. A user 14 operates first computing device 20-1 as a participant in the video conference, and may be interchangeably referred to herein as a participant or as user 14. User 14 may have joined the video conference when first computing device 20-1 received a call-back to join the video conference approximately at a scheduled time for the video conference. Similarly, as described herein for illustrative purposes only, five additional participants operate one of computing devices 20-2 through 20-6. As described above, in other examples, different numbers of participants and different numbers of computing devices 20 may be engaged in the real-time video conference.

In one example, computing devices 20 exchange communication data over communication channel 34, which may be streamed real-time. In some examples, communication data may include communication data 36, which may include video, image, and audio data. Image data may be any data that can be visually represented on GUI 4. Communication data 36 may include one or more still images, a video, a document, a visual presentation, or the like. In one example, communication data 36 may be one or more real-time video feeds. As described herein, communication data 36 may comprise a plurality of image data signals. In some examples, the image data signals may be associated with a participant or user. In some examples, each computing device 20-2 through 20-6 communicatively coupled to computing device 20-1 may provide an image data signal as part of communication data 36.

In one example, communication data 36 may include audio feeds from the one or more participants. In some examples, communication data 36 may comprise speech of a participant (for example, a participant using fifth computing device 20-5 may be speaking). As described herein, communication data 36 may comprise a plurality of audio data signals. In some examples, the audio data signals may be associated with a participant. In some examples, each computing device 20-2 through 20-6 communicatively coupled to computing device 20-1 may provide an audio data signal as part of communication data 36.

Communication channel 34 may also transfer document data 38 between first computing device 20-1 and at least one of the one or more computing devices 20-2 through 20-6 or server 30. Document data 38 may comprise data relating to one or more documents that may be associated with the communication session. The documents may be shared between participants using computing devices 20 of the communication session. In some examples, some users may have authorization to edit the one or more documents.

In some examples, communication data 36 and document data 38 may be transferred between computing devices 20 over different channels. In other examples, document data 38 and communication data 36 may be transferred over a single channel. In one example, communication channel 34 may use a Real-time Transport Protocol ("RTP") standard developed by the Internet Engineering Task Force ("IETF"). In examples using RTP, communication data 36 may have a format such as H.263 or H.264. In other examples, other protocols or formats are used. In other examples, some or all of the communication data may be transferred encrypted, such as, for example, using Secure Real-time Transport Protocol (SRTP), or any other encrypted transfer protocol.

In one example, first computing device 20-1 may generate a portion of communication data 36 from camera 16 and from input device 52 (for example, a microphone). In one example, first computing device 20-1 may receive video data from camera 16. In one example, output from camera 16 is provided to one or more of computing devices 20-2 through 20-6 so image data associated with user 14 may be displayed on one or more of computing devices 20-2 through 20-6. Image data associated with user 14 may include any image data user 14 wishes to display during the communication session. For example, camera 16 may be pointed approximately at user 14 in order that other participants in the video conference may see an image of user 14.

In other examples, user 14 may direct camera 16 elsewhere, for example, at a scene or a document.

In one example, communication data 36 may comprise image data and audio data that may be associated with each other (for example, the audio data is diegetic to the image data). In other examples, the image data and the audio data may not be associated with each other (for example, the audio data is non-diegetic with the image data, for example, a sound track is played along with image data). In some examples, communication data 36 may include both audio data and image data; however, in other examples, communication data 36 may include only one of either audio data or image data. Further, at any given moment during the real-time video communication, any of computing devices 20-1 through 20-6 may be sending only communication data 36, only document data 38, or both.

Computing device 20-1 includes a communications client 8 that, when executed, provides functionality to computing device 20-1 to establish and maintain communications between one or more computing devices 20-2 through 20-6. Communication client 8 may further include a communication module 9. Communication module 9 may provide functionality for computing device 20-1 to engage in a communication session with one or more other users using different computing devices. Communication module 9 may further include functionality that enables communication client 8 to connect to a communication server and join one or more communication sessions. Communication module 9 may also provide functionality for computing device 20-1 to indicate to one or more other users the availability of user 14 to engage in a communication session. In some examples, one or more friends included in a social circle of user 14 are notified of the status of user 14 by communication module 9. A social circle may include one or more other users that may be among a group of people having one or more defined relationships with user 14 (for example, friends of user 14 in a social media application, colleagues, family, etc.). Communications client 8 may also provide signals to GUI 4 to display information related to the communication session and to enable user 14 to interact with communications client 8.

Computing device 20-1 may include a calendar application 11. Calendar application 11 may provide functionality to schedule meetings or appointments, such as for communication sessions. Appointments may be saved in calendar application 11 and may define one or more of a date, time, place, title, topic, documents associated with the appointment, or other information for a meeting. Appointments may also identify invitees to the meeting or communication session. An invitee to a communication session may be a computing device or a user who has been invited to participate in the communication session. If a computing device or a user has not been invited to participate in the communication session, the computing device or user may seek an invitation to the communication session.

Calendar application 11 may issue a meeting notification 17 at a scheduled date and time for a communication session. Meeting notification 17 may be an announcement that provides information or serves as a reminder about an appointment. Meeting notification 17 may be outputted by an output device, such as touch-sensitive display 12. Meeting notification 17 or other meeting notifications may be outputted one or more times by computing device 20-1. In some examples, meeting notification 17 may be outputted by computing device 20-1 when computing device 20-1 receives a signal to output meeting notification 17. Meeting notification 17 may also be displayed multiple times for meetings that reoccur.

In some examples, meeting notification 17 may display a network link 18. A network link may connect a computing device to data accessible over a networked connection. In some examples, network link 18 may be a uniform resource locator (URL) or uniform resource identifier (URI), which may be a character string that includes a reference to an Internet resource. As shown in the example of FIG. 1, network link 18 is the character string "Workgroup Conference", which may be an interactive touch-target. In other examples, a network link may direct computing device 20-1 to a local resource, such as a document stored on a memory of computing device 20-1. Network link 18 may also initiate a connection of computing device 20-1 to a communication session.

Communications client 8 may include a calendar integration module 6 and a callback module 10. Calendar integration module 6, in various instances, provides computing device 20-1 with capabilities to integrate aspects of a communication session into one or more meeting notifications 17 scheduled into a calendar application of computing device 20-1. Calendar integration module 6 may integrate documents associated with the communication session with the meeting notifications. Callback module 10 provides capabilities for user 14 to receive a callback at a selected device, such as computing device 20-1 or another device capable of receiving a network or telephone call. Callback module 10 may also integrate with calendar application 11 to provide network link 18 for setting up and receiving a callback. In other examples, communications client 8 contains further communication modules having additional capabilities.

Likewise, one or more of the computing devices 20-2 through 20-6 may send at least one of document data 38 and communication data 36 from similar input devices to computing device 20-1. During a video conference, computing device 20-1 may output some or all of this received document data 38 and communication data 36, for example, with output devices 54 (for example, a speaker) and GUI 4. In further examples, image data associated with communication data 36 may not be streamed while document data 38 is streamed. In further examples, audio data may not be streamed while image data is streamed. In another example, multiple audio data signals may be streamed by computing device 20-1.

GUI 4 of computing device 20-1 may display all or part of document data 38 and communication data 36. Communications client 8 may define a number of image data signals that may be displayed on GUI 4 at any given moment during a communication session. Communications client 8 may also display meeting notifications from calendar application 11. For example, as shown in FIG. 1, GUI 4 may be configured to display meeting notification 17 associated with a communication session. Meeting notification 17 may be a calendar reminder saved in a calendar associated with calendar application 11. Meeting notification 17 may provide network link 18, which may be used to connect computing device 20-1 to the communication session. Meeting notification 17 may provide one or more links to resources associated with the communication session. As shown in FIG. 1, these resources are three documents, including a text-based document (agenda for meeting.txt), a presentation (strategy.ppt), and a budget (budget analysis.pdf). In other examples, other numbers and types of documents may be integrated with meeting notification 17.

Figure 2:
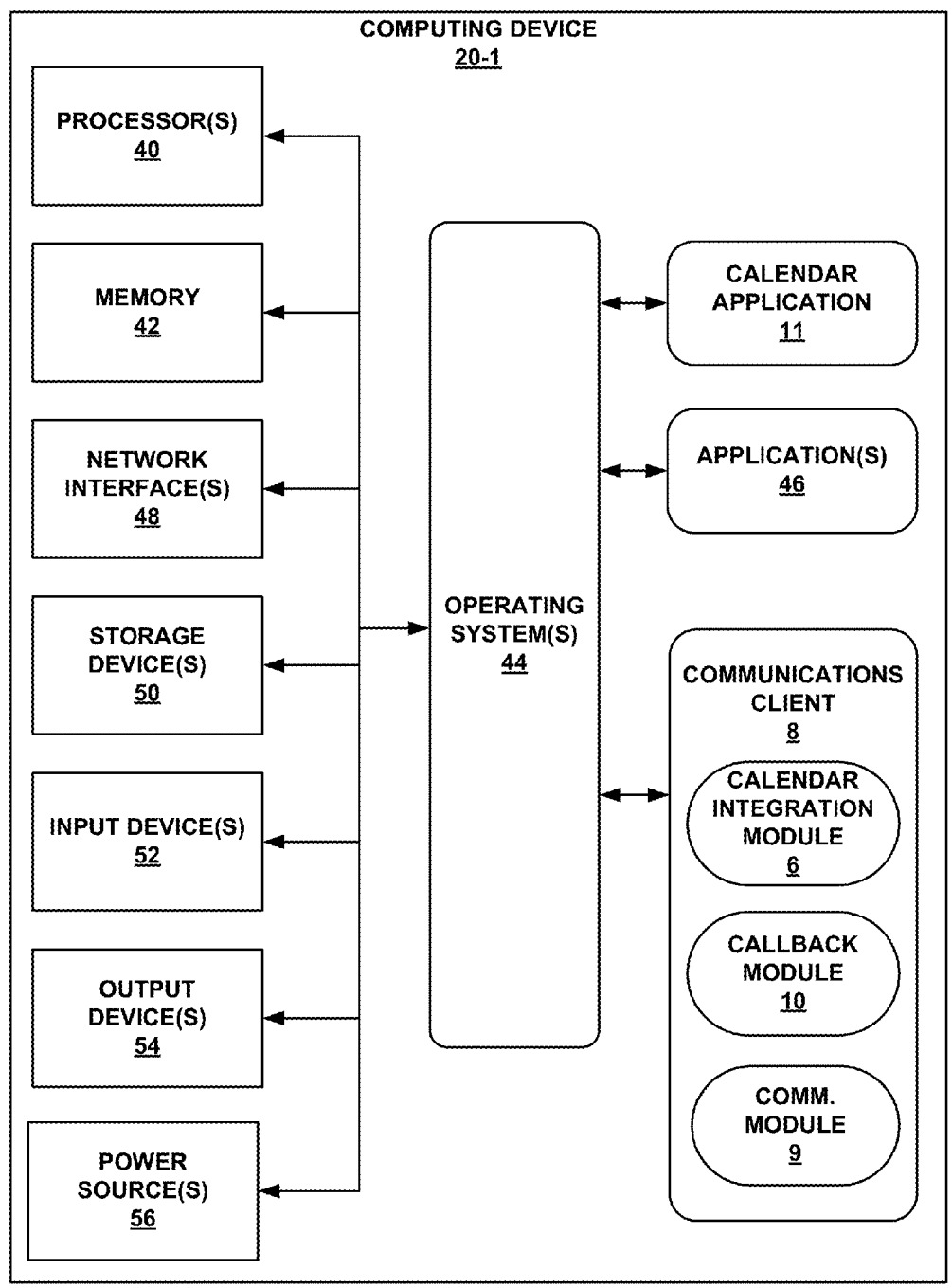
FIG. 2 is a block diagram illustrating further details of one example of computing device shown in FIG. 1, in accordance with one or more aspects of the present disclosure.

FIG. 2 is a block diagram illustrating further details of one example of computing device 20-1 shown in FIG. 1. FIG. 2 illustrates only one particular example of computing device 20-1, and many other example embodiments of computing device 20-1 may be used in other instances. Additionally, one or more computing devices 20-2 through 20-6 may be similar to computing device 20-1 as shown in FIG. 2.

As shown in the specific example of FIG. 2, computing device 20-1 includes one or more processors 40, memory 42, one or more network interfaces 48, one or more storage devices 50, one or more input devices 52, one or more output devices 54, and one or more power sources 56. Computing device 20-1 also includes one or more operating systems 44. Computing device 20-1 may include one or more applications 46, calendar application 11, and communications client 8. Communications client 8 may include selection module 6 executable by computing device 20-1. One or more operating systems 44 may include communications client 8, calendar integration module 6, or callback module 10 executable by computing device 20-1. Operating system 44, applications 46, and communications client 8 are also executable by computing device 20-1. Each of components 40, 42, 44, 46, 48, 50, 52, 54, 56, 6, 8, 10, and 11 may be interconnected (physically, communicatively, and/or operatively) for inter-component communications.

Processors 40 may be configured to implement functionality and/or process instructions for execution in computing device 20-1. Processors 40 may be capable of processing instructions stored in memory 42 or instructions stored on storage devices 50.

Memory 42 may be configured to store information within computing device 20-1 during operation. Memory 42 may, in some examples, be described as tangible or a non-transitory computer-readable storage medium. In some examples, memory 42 is a temporary memory, meaning that memory 42 may be used for short-term storage. Memory 42 may also, in some examples, be described as a volatile memory, meaning that memory 42 does not maintain stored contents when computing device 20-1 is turned off. Examples of volatile memories include random access memories (RAM), dynamic random access memories (DRAM), static random access memories (SRAM), and other forms of volatile memories known in the art. In some examples, memory 42 may be used to store program instructions for execution by processors 40. Memory 42 may be used by software or applications running on computing device 20-1 (for example, one or more of applications 46) to temporarily store information during program execution.

Storage devices 50 may also include one or more tangible or non-transitory computer-readable storage media. Storage devices 50 may be configured to store larger amounts of information than memory 42. Storage devices 50 may further be configured for long-term storage of information. In some examples, storage devices 50 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 20-1 may also include one or more network interfaces 48. Computing device 20-1 may utilize one or more network interfaces 48 to communicate with external devices via one or more networks (for example, network 32 shown in FIG. 1). In one example, one or more network interfaces 48 may correspond to an interface for receiving data from computing devices (for example, computing devices 20-2 through 20-6 of FIG. 1). In some examples, computing device 20-1 may include a plurality of either or both input and output interfaces. In some examples, network interfaces 48 may include separate input and output network interfaces of network interfaces 48. In other examples, input and output interfaces may be may be functionally integrated.

One or more network interfaces 48 may include one or more of a network interface card, such as an Ethernet card, configured to communication over, for example, Ethernet, transmission control protocol (TCP), Internet protocol (IP), asynchronous transfer mode (ATM), or other network communication protocols. In other examples, one of network interfaces 48 may be an optical transceiver, a radio frequency transceiver, or any other type of device that can send and receive information. Examples of such network interfaces may include Bluetooth®, 3G and WiFi® radios in mobile computing devices as well as USB. Examples of such wireless networks may include WiFi®, Bluetooth®, and 3G. In some examples, computing device 20-1 may utilize network interface 48 to wirelessly communicate with an external device, such as server 30 or computing devices 20-2 through 20-6, a mobile phone, or other networked computing device. One or more network interfaces 48 may be used to connect to a webpage or other resource when a network link, such as network link 18 of FIG. 1, is activated.

Computing device 20-1 may also include one or more input devices 52. Input devices 52 may be configured to receive input, for example, from user 14, through tactile, audio, or video feedback. Examples of input devices 52 may include a touch-sensitive display, a mouse, a keyboard, a voice responsive system, a microphone, video camera 16, or any other type of device for detecting a command from user 14. In one example, one or more input devices 52 may comprise input/output device 12 as shown in FIG. 1. In another example, one or more input devices 52 may comprise a display device that provides GUI 4 as shown in FIG. 1.

One or more output devices 54 may also be included in computing device 20-1, for example, GUI 4. Output devices 54 may be configured to provide output to user 14 using tactile, audio, or video output. Output devices 54 may include a touch-sensitive display, and may utilize a sound card, a video graphics adapter card, or any other type of device for converting a signal into an appropriate form understandable to humans or machines. Additional examples of output devices 54 may include a speaker, a cathode ray tube (CRT) monitor, a liquid crystal display (LCD), or any other type of device that can provide output to user 14. In one example, one or more output devices 54 may comprise input/output device 12 as shown in FIG. 1. In another example, one or more output devices 54 may comprise GUI 4 as shown in FIG. 1.

Computing device 20-1 may include one or power sources 56, which may provide power to computing device 20-1. One or more power sources 56 may be internal to client device 10, such as a battery, or may be an external power source. In other examples, computing device 6-1 may be connected to an electrical grid through power source(s) 56, for example, via a power outlet or telephone line. The one or more power sources 56 may be one or more batteries, which may be rechargeable. The one or more batteries may be made from nickel-cadmium, lithium-ion, or any other suitable material.

Computing device 20-1 may include one or more operating systems 44. One or more operating system 44 may control the operation of components of computing device 20-1. For example, operating systems 44 may facilitate the interaction of application 46 or communications client 8 with processors 40, memory 42, network interfaces 48, storage devices 50, input devices 52, output devices 54, and power sources 56.

Communications client 8 may additionally include calendar integration module 6 and callback module 10, which may be executed as part of operating system 44. In other cases, calendar integration module 6 or callback module 10 may be implemented or executed by computing device 20-1. Calendar integration module 6 may process conference resources such as documents (such as, through document data 38), access control to the documents, and manage meeting reminders for a communication session. Callback module 10 may provide functionality to set up and receive callbacks from another computing device, such as a meeting organizer or server (for example, one of computing devices 20-2 through 20-6).

Communications client 8 may provide signals to instruct GUI 4 to display images and user selectable options or fields associated with the communication session, documents, or a meeting notification. Additionally, calendar integration module 6 or callback module 10 may receive input from a component such as processors 40, memory 42, one or more network interfaces 48, one or more storage devices 50, one or more output devices 54, one or more power sources 56, or operating system 44. In some cases, calendar integration module 6 or callback module 10 may perform additional processing on communication data 36 and document data 38. In other cases, calendar integration module 6 or callback module 10 may transmit input to an application, for example calendar application 11, or other component in computing device 20-1.

Any applications, for example calendar application 11 or applications 46, implemented within or executed by computing device 20-1 may be implemented or contained within, operable by, executed by, and/or be operatively/communicatively coupled to components of computing device 20-1, for example, one or more processors 40, memory 42, one or more network interfaces 48, and/or storage devices 50.

FIGS. 3A-3F are screen diagrams illustrating examples of a callback feature on a computing device, in accordance with one or more aspects of the present disclosure. The computing device providing the GUIs in FIGS. 3A-3F may be a computing device 20-1. FIGS. 3A-3F illustrate an example of how a callback may be requested and used to connect a selected computing device to a communication session. FIGS. 3A-3F are discussed in terms of computing device 20-1 of FIGS. 1 and 2. Also, FIGS. 3A-3F are discussed in terms of computing device 20-1 being a mobile phone and having an appointment scheduled for a communication session.

A user, such as user 14, may operate computing device 20-1. Computing device 20-1 may include a calendar application 11, one or more applications 46, a communication client 8, one or more input devices 52, and one or more output devices 54. In some examples, one or more of the input devices 52 and one or more of the output devices 54 may be integrated into a single input/output device, such as a presence-sense screen or a touch screen. Computing device 20-1 may communicate with a server device via a communication channel, such as server device 30 and communication channel 34 as shown in FIG. 1.

Figure 3B:
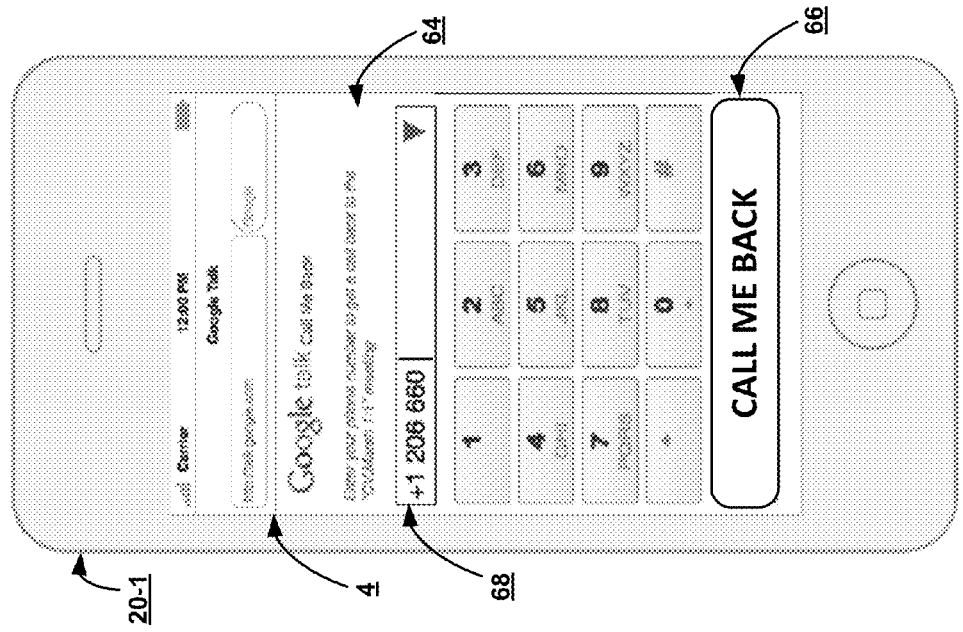
FIGS. 3A-3F are screen diagrams illustrating examples of a callback feature on a computing device, in accordance with one or more aspects of the present disclosure.
Figure 3A:
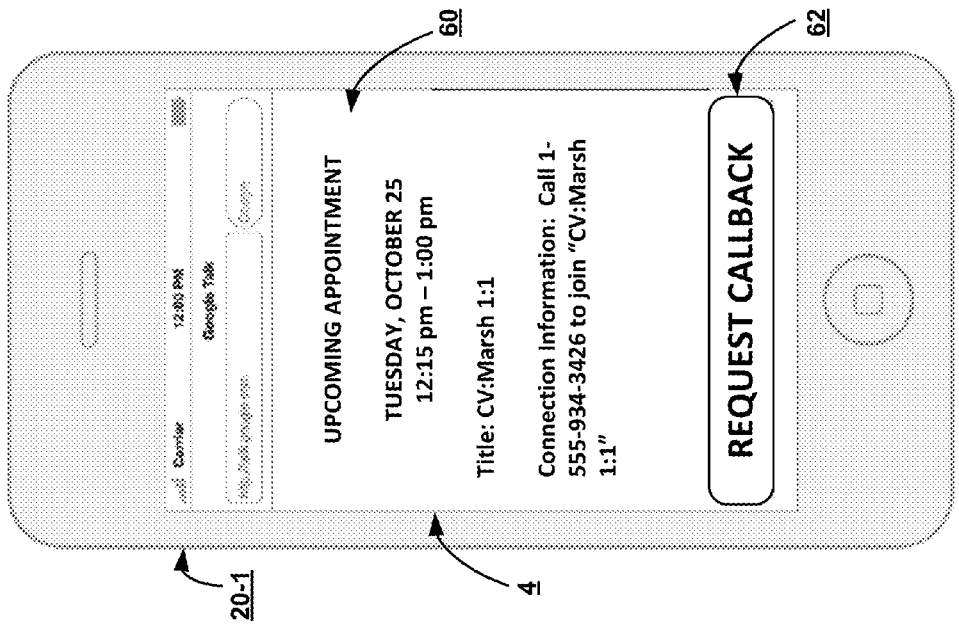

FIG. 3A depicts one example of a GUI 4 displaying a meeting notification 60 informing a user, such as user 14, of an upcoming appointment. Meeting notification 60 may provide information related to the upcoming communication session. In FIG. 3A, meeting notification 60 is for a communication session at a scheduled meeting time, shown as Tuesday, October 25 from 12:15 pm to 1:00 pm. Information in meeting notification 60 shown in FIG. 3A also includes a title or name of the communication session, a date and time of the communication session, and connection information. In other examples, other information may be provided in meeting notification 60.

It may be difficult for a user to join the communication session by directly entering the connection information into computing device 20-1. For example, when computing device 20-1 is a mobile phone, user 14 may have to manually enter the phone number provided in the connection information of notification 60 in order to join the communication session. User 14 may have to toggle between meeting notification 60 and a GUI that allows user 14 to enter the connection information. Without being able to access the connection information through other means (such as writing the phone number down or memorization, for example), user 14 may have a difficult time joining the communication session.

Meetings in a calendar, such as calendar application 11, may include a "call me back" link. The link may be a network-based link, such as a URL, that may be used to join a scheduled communication session. This link may be appended to one or more fields in calendar application 11 or in meeting notification 60. In one example, from meeting notification 60 (or other calendar event), a pop may be displayed on computing device 20-1 (such as, for example, a mobile phone). The meeting notification may contain the URL. A user, such as user 14, may click, touch, or otherwise select the link to join the communication session. The link may be easily accessible from a smartphone calendar or notification.

In order to provide means for obtaining a callback to join the communication session, meeting notification 60 may also include a network link 62. FIG. 3A shows network link 62 as a touch-target or virtual button. However, in other examples, network link 62 may be a physical button or other user interactive element. Network link 62 may enable a user of computing device 20-1 to request a callback to join the communication session. A callback may be requested for computing device 20-1 or for another computing device. Thus, when user 14 successfully requests a callback, computing device 20-1 or another selected computing device may receive a call at approximately the scheduled meeting time. In some examples, a callback may be scheduled for a time different than the scheduled meeting time. By answering the call from a callback request, computing device 20-1 may connect to the communication session.

Selecting network link 62 may launch a browser on computing device 20-1, with provides a user interface for requesting a callback. The browser may display a landing page that may be used to request a callback. FIG. 3B depicts one example of GUI 4 displaying a callback request interface 64 enabling user 14 to input a phone number or select a computing device in order to receive a callback. Callback request interface 64 may be a webpage on a web browser.

In some examples, user 14 may have to sign in to callback request interface 64. Signing in and launching the callback request interface 64 may be a part of a process for joining the scheduled communication session. The callback request interface 64 may also verify user 14 is available for the communication session or that the communication session is being or will be held. Signing in may enable a name, topic, or other information related to the communication session may be retrieved and displayed by computing device 20-1.

Information about at least one of computing device 20-1 or user 14 may also be provided to a computing device hosting the communication session, such as server 30. In some examples, user 14 may be able to provide permission or deny permission for certain information to be provided to other computing devices, such as server 30.

If user 14 is not already signed in to callback request interface 64, for example, a separate user interface may be launched that allows user 14 to sign in. In one example, a separate user interface for signing in may be a sign-in page for a single sign-in system. A receiving webpage may determine that access is coming from computing device 20-1 based on a user-agent string provided into the sign-in system. A user-agent string may be a character sting that identifies a browser or a computing device.

Callback request interface 64 may prompt user 14 to enter a phone number in field 68 in order to receive a callback. In some examples, the first time user 14 accesses the callback request interface 64, user 14 may be asked for a phone number. The phone number may correspond to computing device 20-1 or to another computing device. The inputted phone number may be stored in a setting that is used upon subsequent access. The settings may be stored in a user account or profile for user 14. User 14 may be able to add multiple phone numbers or other connecting information for other computing devices. In incremental updates, each phone number entered may be stored in the settings. In some examples, user 14 may be able to assign priority levels to the phone numbers or computing devices. In subsequent accesses to callback request interface 64, user 14 may be able to join a communication session using only a single click.

Once a phone number is entered in field 68, user 14 may toggle submit button 66. As shown in FIG. 3B, submit button 66 is labeled "Call Me Back." By toggling submit button 66, a callback may be requested for the phone number inputted into field 68. A computing device, such as a mobile phone, associated with the phone number may receive a call at approximately the scheduled meeting time. The call may be from a computing device hosting the communication session, such as a server or another participant in the communication session.

Figure 3D:
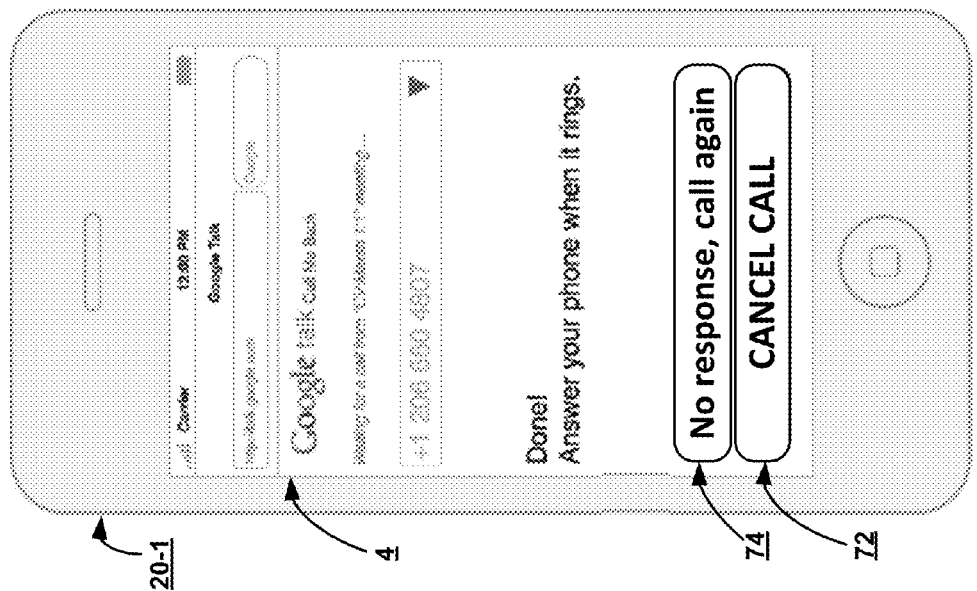
Figure 3C:
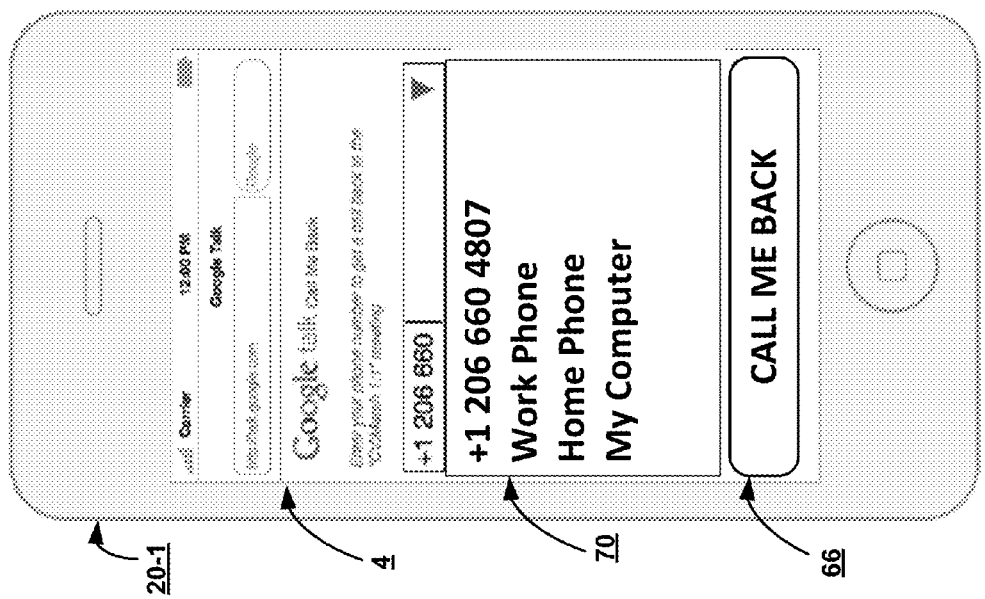

FIG. 3C depicts one example of a GUI 4 showing a drop down menu 70 listing labels for phone numbers, names, or other identifications of devices that may receive a callback. In some examples, interacting with field 68 may cause drop-down menu 70 to be displayed. As shown in FIG. 3C, a phone number matching the phone number partially entered in field 68, a label for a work number and a home number, and a computer name "My Computer" are shown. These may correspond to devices that may receive a callback to join a communication session. User 14 may select any of these labels to receive a callback. User 14 may select a label by touching a touch target associated with the label, using a keyboard to select the label, or by other means. In some examples, drop-down menu 70 may not be displayed until one or more phone numbers or other identifying information has been provided. This information may be saved in a user profile that is accessible by the landing page.

Once a phone number is submitted, a callback request may be submitted to a computing device or server that hosts the multi-user conference or communication session. FIG. 3D shows one example of GUI 4 showing a landing page that indicates a callback has been successfully requested. A cancel button 72 may be displayed that provides an option to cancel the callback. Cancel button 72 may be a user selectable option (such as a touch-target) that cancels the callback when user 14 selects cancel button 72. Additionally, another user selectable option, report button 74, may be provided to inform the multi-user conference host that the selected computing device has not received a call. In some examples, report button 74 may signal the multi-user conference host to redial the selected computing device. As shown in the example of FIG. 3D, cancel button 72 is labeled "Cancel Call" and report button 74 is labeled "No response, call again." In some examples, report button 74 may be displayed for a predetermined length of time, such as 15 seconds or another time. The length of time may be selected based on a typical time it takes to complete a callback.

Figure 3F:
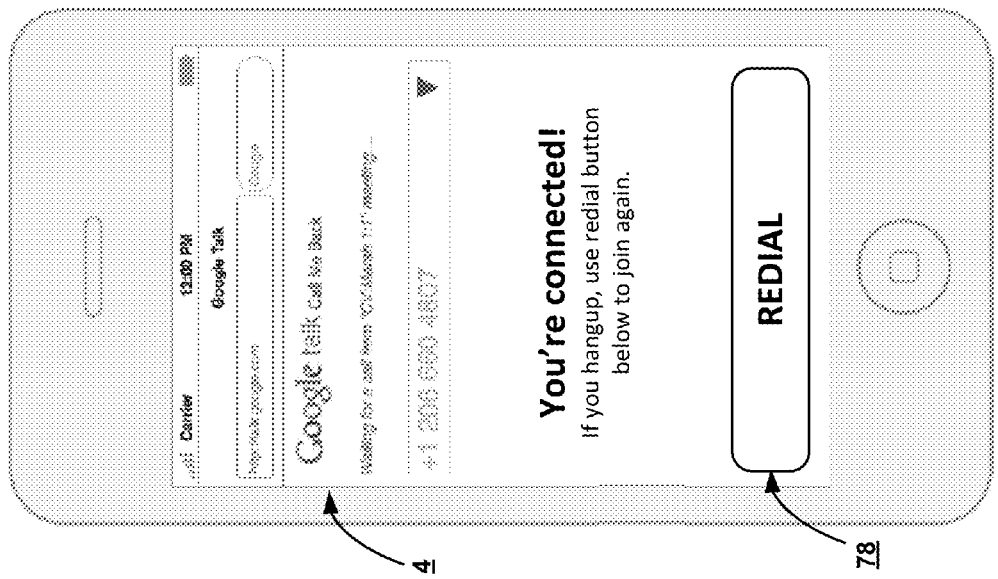
Figure 3E:
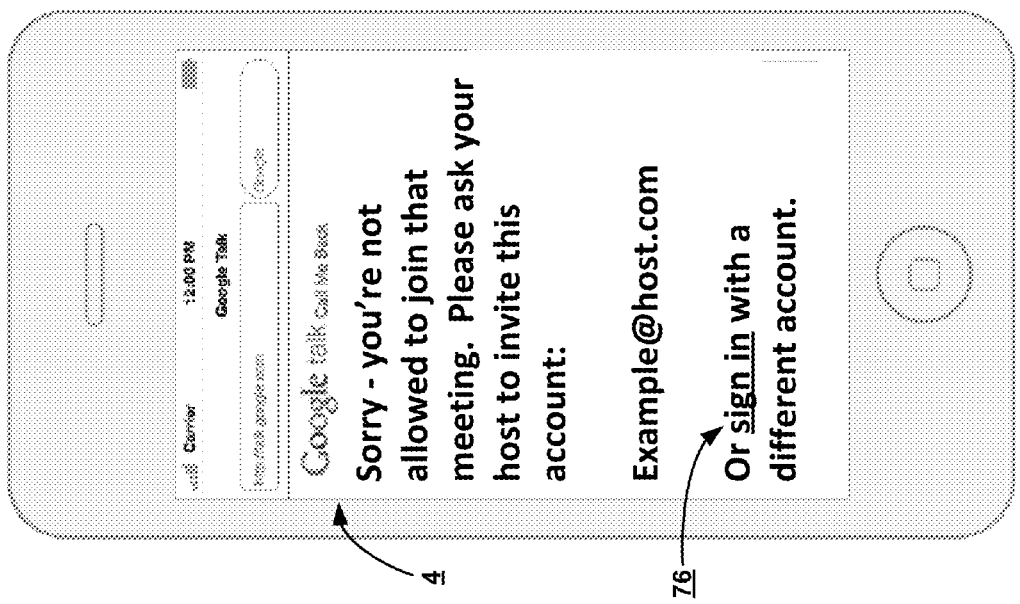

In some examples, the landing page may display a status of the call. FIG. 3E shows one example of GUI 4 indicating that user 14 has not connected to the communication session and providing an option, such as a sign-in link 76, to sign in with a different account. Sign-in link 76 may be a user-selectable link that loads or opens a sign-in webpage or other application.

If a callback number has been registered already, user 14 may not have to click the call button. The call initiation may take place relatively immediately, providing user 14 with "1-click" entry into the communication session. If the communication session does not exist, or if user 14 was not allowed to enter the communication session, graphical user interface 4 may explain that an explicit invite is needed to join the communication session.

If the communication session does exist and acknowledges receipt of the callback request, a call pending page may be shown. The call pending page may show a redial button after a selected time period (for example, 15 seconds) if the call fails for some reason. After the call connects, the cancel button may be removed. A redial button may be provided while user 14 is connected in case user 14 loses connection and has to dial in again. FIG. 3F shows one example of GUI 4 indicating that computing device 20-1 has successfully connected to the communication session. GUI 4 in FIG. 3F also provides a redial button 78. Redial button 78 may reconnect to the communication session if toggled after computing device 20-1 looses connection to the communication session while the session is still active.

In another aspect of this disclosure, typical video conferencing devices may be identified by phone numbers which may be called or dial out to a given phone number. However, this may require a user to remember phone numbers or page through a long list of named devices, and to know the location of the other users so as to select the correct device. Users may also use an unscheduled device to join a communication session. Thus, users may need a simple name to type that can be communicated verbally or remembered easily in order to connect to a communication session using an unscheduled device.

Because communication sessions may be integrated with a calendar application, rather than requiring user 14 to know the location of the other parties, a scheduled device can show a list of meetings that are upcoming. In one example, meetings that are scheduled for that location may be displayed. This may allow user 14 to tap one button or select a single option to join a communication session, making it much faster than looking up a phone number and entering the communication session.

Figure 4:
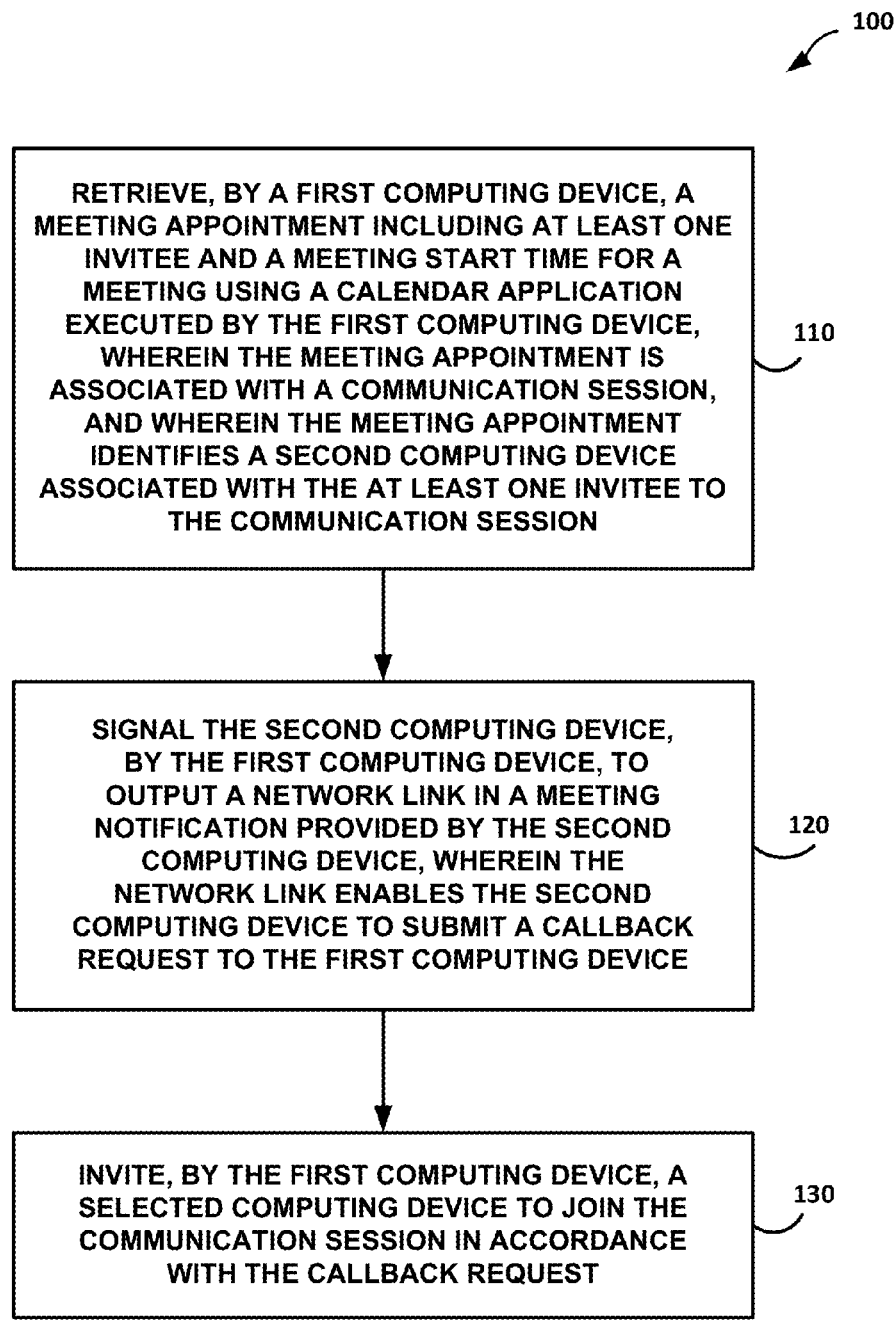
FIG. 4 is a flow chart illustrating an example method of a callback feature integrated with a calendar application, in accordance with one or more aspects of the present disclosure.

FIG. 4 is a flow chart illustrating an example method 100 of a callback feature integrated with a calendar application, in accordance with one or more aspects of the present disclosure. Method 100 of FIG. 4 may be described with respect to computing device 20-1 of FIG. 1 or 2. However, the example method 100 of FIG. 4 may be performed using other devices.

Method 100 may include retrieving, by a first computing device, a meeting appointment including at least one invitee and a meeting start time for a meeting using a calendar application executed by the first computing device, wherein the meeting appointment is associated with a communication session that enables communication between different computing devices, and wherein the meeting appointment identifies a second computing device associated with the at least one invitee to the communication session (110). Method 100 may also include signaling the second computing device, by the first computing device, to output a network link in a meeting notification provided by the second computing device, wherein the network link enables the second computing device to submit a callback request to the first computing device (120).

Method 100 may also include inviting, by the first computing device, a selected computing device to join the communication session in accordance with the callback request (130). Without a callback, user 14 may have to call a conference server (such as a long 800 phone number) and enter a PIN code to join a meeting. This can be a hazard while doing some activities, such as driving. A meeting invitation sent to invitees of the communication session may contain unique URLs, in some cases containing the phone number of the user to whom the invitation is sent. The smartphone may receive a notification that includes the URL of the meeting to join. The URL may open a browser application already installed on most computing devices to enable a user to request a callback, thereby not requiring any additional applications installed on the computing device. A small (such as, for example, less than 10 kilobytes) page may load with the phone number (from the URL) pre-filled into a field. The user may click "call me back" and another computing device participating in or hosting the communication session may dial the smartphone directly. The user may complete the call in two clicks. In addition, the conferencing system may be able to identify which computing device or user has requested the callback because the URL may be unique for each computing device or user.

In some cases, the URL may not include the phone number, if the inviter does not know the invitee's phone number. Phone numbers may be selected from the user's contacts, domain contacts, shared contacts within the domain, or possibly a global directory (such as a global directory of a business or social media). In these cases, when the user clicks the aforementioned URL, the user may type the phone number of the computing device into the field. The communication session host or system may remember the phone number for subsequent meetings, regardless of the inviter, allowing for a one-time setup action.

In some examples, a computing device, such as a smartphone, may not have enough bandwidth to participate in the meeting. Thus, a user may select a different computing device to receive a callback so the user may participate in the communication session.

In additional examples, the communication session host or system could store a phone number with an email address of the user. This phone number may be identified as the preferred phone number (or one of multiple phone numbers) so as to create a very simple global conferencing service. In some examples, security may be very important to protect privacy and identity. In this case, user may be able to log in with a separate account before being able to enter a phone number to call back. Because the user's identity is protected with proper credentials, the meeting can ensure that the attendee is uniquely that user and label the user accordingly.

In other examples, method 100 includes user input selecting the network link that may be received at the computing device. Responsive to the selection, a web browser may be launched that connects to the network link. The user may provide input requesting a callback on the selected device. The user input may also select a device (such as the computing device or another device) on which to receive the callback. The first computing device may receive a call from a second computing device associated with the communication session at approximately the scheduled meeting time. In another example, the callback request specifies a time other than the approximate scheduled meeting time to receive a callback.

In another example, method 100 further includes identifying a third computing device in the appointment, wherein the third computing device is an invitee to the communication session. The third computing device may be invited by the first computing device to join the communication session at the time defined in the callback request. For example, if the callback request defines a specific time to call the selected computing device, the third computing device will be invited to join the communication session at approximately the time specified in the callback request.

In another example, method 100 may include inviting the selected computing device to join the communication session in accordance with the callback request further comprises inviting the selected computing device to join the communication session at approximately the scheduled meeting time. In some examples, the selected device may be the second computing device. In other examples, the callback request may define a third computing device for the first computing device to invite to the communication session. In some examples, inviting the selected computing device to join the communication session may comprise calling a telephone number of the selected computing device.

Method 100 may further include identifying the selected computing device from a webpage associated with the network link, wherein the callback request defines the selected computing device on the webpage. In some examples, the network link may be a uniform resource locator (URL) or uniform resource identifier (URI) link.

Method 100 may further include signaling the second computing device, by the first computing device, to provide a telephone number for the selected computing device to receive a call. The first computing device may receive an acceptance of the invitation to join the communication session from the selected computing device. Responsive to receiving the acceptance of the invitation, the first computing device may connect the selected computing device to the communication session.

Method 100 may further include receiving, at the first computing device, a request to join the communication session by a third computing device not identified as an invitee to the communication session in the appointment. Responsive to receiving the request, the first computing device may determine if the third computing device is associated with the second computing device. When the third computing device is associated with the second computing device, the third computing device may be invited to join the communication session. The third computing device may be associated with the second computing device through a common user, for example, which may be determined using login information. In other examples, the third computing device may be associated with the second computing device when the second computing device was used to create a callback identifying the third computing device. When the third computing device is not associated with the second computing device, the first computing device may signal or otherwise notify the third computing device to obtain permission to join the communication session.

Figure 5:
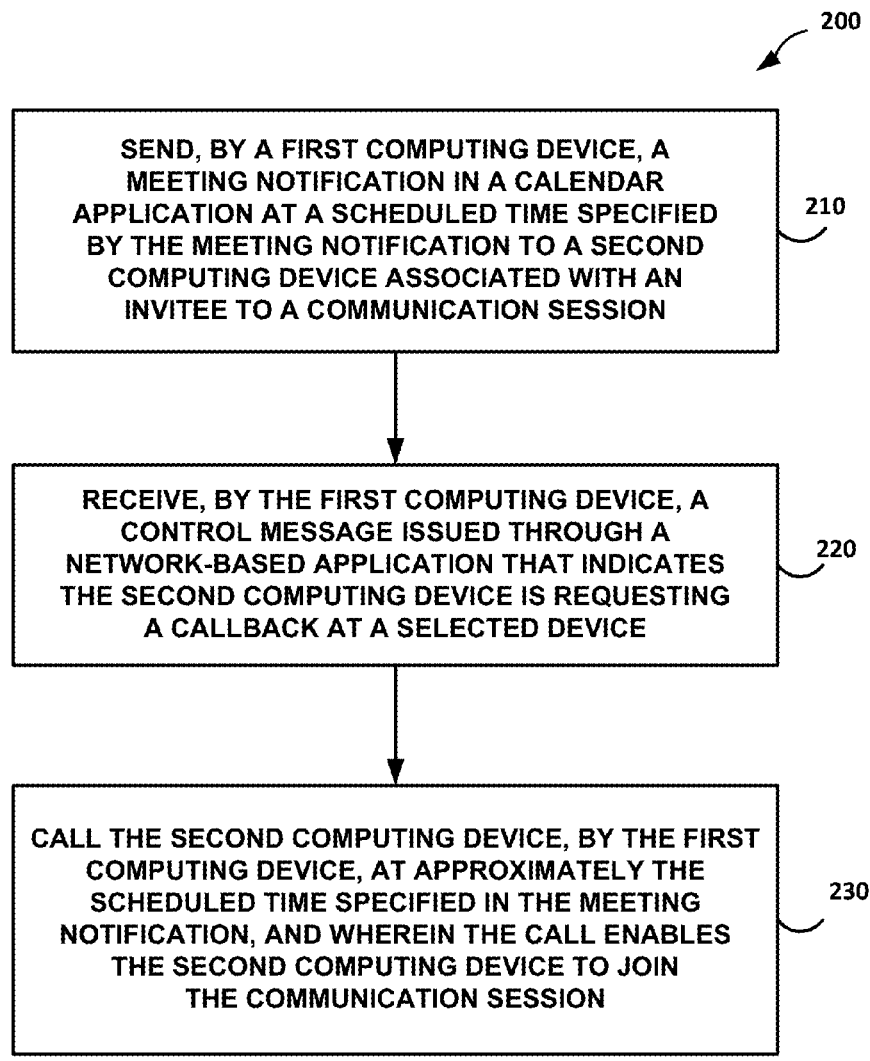
FIGS. 5 and 6 are flow charts illustrating example methods of a callback feature for joining a communication session, in accordance with one or more aspects of the present disclosure.

FIG. 5 is a flow chart illustrating an example method 200 of a callback feature for joining a communication session, in accordance with one or more aspects of the present disclosure. Method 200 of FIG. 5 may be described with respect to computing device 20-1 of FIG. 1 or 2. However, the example method 200 of FIG. 5 may be performed using other devices.

Method 200 may include sending, by a first computing device, a meeting notification from a calendar application at a scheduled time specified by the meeting notification to a second computing device associated with an invitee to a communication session that enables communication between different computing devices (210). The first computing device may be a communication session host or another invitee to the communication session. The second computing device may a computing device of one or more users invited to the communication session.

Method 200 may further include receiving, by the first computing device, a control message issued by a network-based application that indicates the second computing device requested a callback for a selected computing device (220). Method 200 may further include inviting the selected computing device, by the first computing device, to the communication session at approximately the scheduled time specified in the meeting notification, wherein an invitation enables the second computing device to join the communication session (230).

The control message may further comprise a computing device identifier that identifies a third computing device as the selected computing device. In other examples, method 200 may include sending, by the first computing device, a third request to the third computing device that enable the third computing device to join the communication session. The control message may further comprise a postponement time that specifies when at least the first request is sent to the second computing device or the second request is sent to the third computing device.

In another example, the first computing device may send a reminder to the second computing device prior to the scheduled time of the meeting notification, wherein the reminder requests a time when the first request is sent to the second computing device. The first computing device may receive a control message from the second computing device that specifies when the first is sent to the second computing device.

Figure 6:
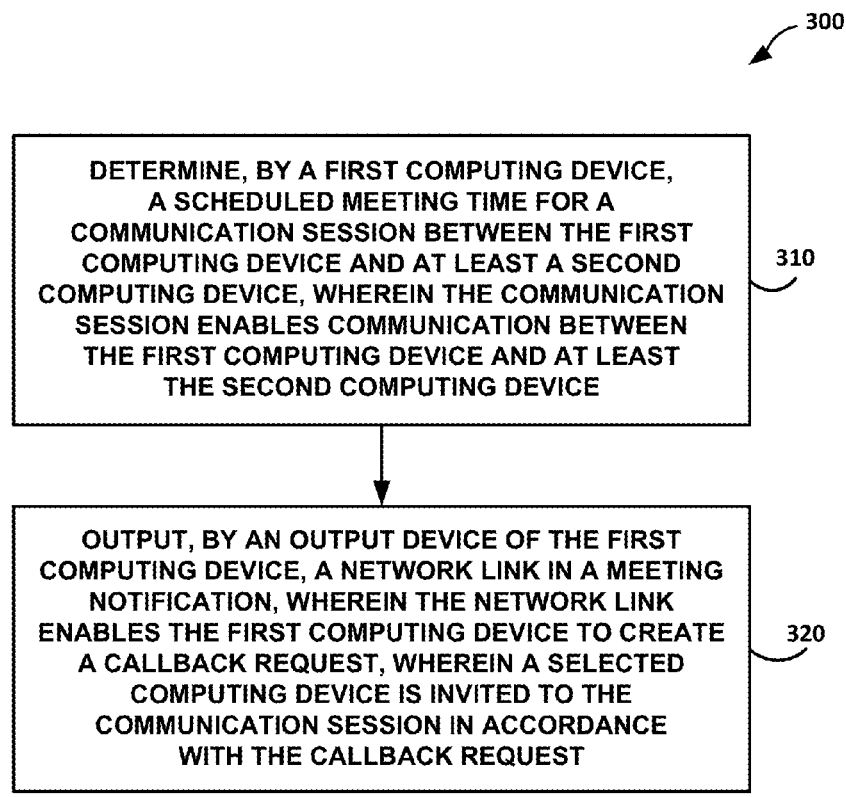

FIG. 6 is a flow chart illustrating an example method 300 of a callback feature for joining a communication session, in accordance with one or more aspects of the present disclosure. Method 300 of FIG. 6 may be described with respect to computing device 20-1 of FIG. 1 or 2. However, the example method 300 of FIG. 6 may be performed using other devices.

Method 300 may include determining, by a first computing device, a scheduled meeting time for a communication session between the first computing device and at least a second computing device, wherein the communication session enables communication between the first computing device and at least the second computing device (310). The first computing device may host the communication session. The second computing device may be a computing device used by a user invited to participate in the communication session.

Method 300 may further include outputting, by an output device of the first computing device, a network link in a meeting notification, wherein the network link enables the first computing device to create a callback request, wherein a selected computing device is invited to the communication session in accordance with the callback request (320).

Method 300 may further include receiving, at the first computing device, user input selecting the network link. Responsive to receiving the user input, a web browser may be launched on the first computing device based on the network link. The first computing device may receive user input selecting a computing device to receive a callback. An identity of the selected computing device may be uploaded to the web browser.

Method 300 may further include receiving user input accessing a calendar application of the first computing device. Determining the scheduled meeting time for the communication session may further include determining the scheduled meeting time from an appointment associated with the communication session stored in the calendar application. In some examples, an output device of the first computing device may output a status notification providing a status of the communication session. The callback request may connect the first computing device to the communication session when a callback is received.

In another example, a callback method includes sending, by a first computing device, a meeting notification in a calendar application at a scheduled time specified by the meeting notification to a second computing device associated with an invitee. The method may further include receiving, by the first computing device, a control message issued through a network-based application that indicates the second computing device is requesting a callback at a selected device. The method may also include placing, by the first computing device, a call to the second computing device at the scheduled time specified in the meeting notification, wherein the call enables the second computing device to join a communication session.

A meeting notification may be scheduled, at the first computing device, in a calendar application of the computing device, wherein the meeting notification is for a communication session that enables communication between users of different computing devices. A calendar application, such as calendar application 11, may schedule the meeting notification. The communication session may be a virtual video conference, or any other type of conference described herein.

When the communication session is a recurring communication session and the meeting notification is a first meeting notification for a first instance of the communication session, a second meeting notification may be scheduled in the calendar application. The second meeting notification may be for the second instance of the communication session and may also provide a network link. Additional instances of the meeting may also be scheduled.

In some examples, method 300 may also include receiving, at the first computing device, a signal to schedule the communication session, wherein the signal comprises information relating to a callback request. The signal may be an invitation sent by another computing device to join the communication session.

If attendees are added dynamically by invitation during the meeting or communication session, the user may be added to the calendar invitation after the meeting has commenced. This may enable an invited user to have a record of what the user was doing at that time. In some examples, a knocking mechanism may be employed for a user who is attempting to join the meeting. The user may receive a callback but be placed on hold until the user receives permission to join the communication session. Permission to join a communication session may be granted to a user by a moderator or a group of users in the communication session. In some examples, the moderator or group of users may be prompted to provide or deny permission to the user when the user requests a callback.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In some examples, an article of manufacture may comprise one or more computer-readable storage media.

In some examples, the computer-readable storage media may comprise tangible or non-transitory media. The term "non-transitory" may indicate that the storage medium is not embodied in a carrier wave or a propagated signal. In certain examples, a tangible or non-transitory storage medium may store data that can, over time, change (for example, in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A method, comprising:
retrieving, by a first computing device, a meeting appointment including at least one invitee and a meeting start time for a meeting using a calendar application executed by the first computing device, wherein the meeting appointment is associated with a communication session that enables communication between different computing devices, and wherein the meeting appointment identifies a second computing device associated with the at least one invitee to the communication session;
signaling the second computing device, by the first computing device, to output a network link in a meeting notification provided by the second computing device, wherein the network link enables the second computing device to submit a callback request to the first computing device;
inviting, by the first computing device, a selected computing device to join the communication session in accordance with the callback request;
receiving, by the first computing device, a request to join the communication session by a third computing device not identified as an invitee to the communication session in the meeting appointment;
responsive to receiving the request, determining if the third computing device is associated with the second computing device;
when the third computing device is associated with the second computing device, inviting the third computing device to join the communication session; and
when the third computing device is not associated with the second computing device, notifying the third computing device to obtain permission to join the communication session.

2. The method of claim 1, wherein inviting, by the first computing device, the selected computing device to join the communication session further comprises calling a telephone number associated with the selected computing device.

3. The method of claim 1, wherein the network link comprises a uniform resource locator (URL) link.

4. The method of claim 1, further comprising:
signaling the second computing device, by the first computing device, to provide a telephone number for the selected computing device to receive a call.

5. The method of claim 1, further comprising:
receiving, by the first computing device, an acceptance of an invitation to join the communication session from the selected computing device; and
responsive to receiving the acceptance of the invitation, connecting the selected computing device to the communication session.

6. A method, comprising:
determining, by a first computing device, a scheduled meeting time for a communication session between the first computing device and at least a second computing device, wherein the communication session enables communication between the first computing device and at least the second computing device;
outputting, by an output device of the first computing device, a network link in a meeting notification, wherein the network link enables the first computing device to create a callback request, and wherein a selected computing device is invited to the communication session in accordance with the callback request;
receiving, at the first computing device, user input selecting the network link;
responsive to receiving the user input, launching a web browser based on the network link;

receiving, at the first computing device, user input selecting a computing device to receive an invitation to the communication session based on the callback request; and uploading, by the first computing device, an identity of the selected computing device to the web browser.

7. The method of claim 6, further comprising:

receiving user input accessing a calendar application executed by the first computing device, wherein determining the scheduled meeting time for the communication session further comprises determining the scheduled meeting time from an appointment associated with the communication session stored in the calendar application.

8. The method of claim 6, further comprising:

outputting, by the output device of the first computing device, a status notification providing a status of the communication session.

9. The method of claim 6, wherein the callback request connects the first computing device to the communication session.

10. A non-transitory computer storage medium encoded with a computer program, the program comprising instructions that when executed by a first computing device causes the first computing device to perform operations comprising:

determining a scheduled meeting time for a communication session between the first computing device and at least a second computing device, wherein the communication session enables communication between the first computing device and at least the second computing device;

outputting a network link in a meeting notification, wherein the network link enables the first computing device to create a callback request, and wherein a selected computing device is invited to the communication session in accordance with the callback request;

receiving user input selecting the network link;

responsive to receiving the user input, launching a web browser based on the network link;

receiving user input selecting a computing device to receive an invitation to the communication session based on the callback request; and uploading an identity of the selected computing device to the web browser.

11. The non-transitory computer storage medium of claim 10, wherein the selected computing device is invited to the communication session by calling a telephone number associated with the selected computing device.

12. The non-transitory computer storage medium of claim 10, wherein the network link comprises a uniform resource locator (URL) link.

13. The non-transitory computer storage medium of claim 10, wherein the instructions cause the first computing device to perform further operations comprising:

signaling the second computing device, by the first computing device, to provide a telephone number for the selected computing device to receive a call.

14. The non-transitory computer storage medium of claim 10, wherein the instructions cause the first computing device to perform further operations comprising:

receiving, by the first computing device, an acceptance of the invitation to join the communication session from the selected computing device; and responsive to receiving the acceptance of the invitation, connecting the selected computing device to the communication session.

\* \* \* \* \*